United States Patent
Zhang et al.

(10) Patent No.: US 9,058,842 B2
(45) Date of Patent: Jun. 16, 2015

(54) SYSTEMS AND METHODS FOR GATE AWARE ITERATIVE DATA PROCESSING

(75) Inventors: Fan Zhang, Milpitas, CA (US); Yang Han, Sunnyvale, CA (US); Ming Jin, Fremont, CA (US); Chung-Li Wang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 414 days.

(21) Appl. No.: 13/552,403

(22) Filed: Jul. 18, 2012

(65) Prior Publication Data

US 2014/0025904 A1    Jan. 23, 2014

(51) Int. Cl.
*G11C 27/00* (2006.01)
*G11B 20/10* (2006.01)

(52) U.S. Cl.
CPC .... *G11B 20/10268* (2013.01); *G11B 20/10509* (2013.01)

(58) Field of Classification Search
USPC .................................. 365/45, 189.15, 189.17
See application file for complete search history.

(56) References Cited

U.S. PATENT DOCUMENTS

| 7,113,356 B1 | 9/2006 | Wu |
| 8,631,300 B2 * | 1/2014 | Han et al. ...................... 714/760 |
| 8,731,115 B2 * | 5/2014 | Yang et al. .................... 375/341 |
| 8,782,486 B2 * | 7/2014 | Zhang et al. .................. 714/758 |
| 8,819,519 B2 * | 8/2014 | Kalluri et al. ................. 714/758 |
| 8,850,276 B2 * | 9/2014 | Xu et al. ....................... 714/701 |
| 8,854,754 B2 * | 10/2014 | Zhang et al. .................... 360/39 |
| 2006/0256670 A1 | 11/2006 | Park |
| 2011/0164669 A1 | 7/2011 | Mathew |

OTHER PUBLICATIONS

U.S. Appl. No. 13/400,750, Unpublished (filed Feb. 21, 2012) (Fan Zhang).
U.S. Appl. No. 138433,742, Unpublished (filed Mar. 29, 2012) (Fan Zhang).
U.S. Appl. No. 13/342,240, Unpublished (filed Jan. 3, 2012) (Shaohua Yang).
U.S. Appl. No. 13/316,953, Unpublished (filed Dec. 12, 2011) (Haitao Xia).
U.S. Appl. No. 13/340,974, Unpublished (filed Dec. 30, 2011) (Dan Liu).
U.S. Appl. No. 13/445,848, Unpublished (filed Apr. 12, 2012) (Bruce Wilson).
U.S. Appl. No. 13/251,342, Unpublished (filed Oct. 3, 2011) (Haitao Xia).

* cited by examiner

*Primary Examiner* — Pho M Luu
(74) *Attorney, Agent, or Firm* — Hamilton DeSanctis & Cha (57) ABSTRACT

The present inventions are related to systems and methods for iterative data processing scheduling. In one case a data processing system is disclosed that includes a data detector circuit and a data decoder circuit. The data detector circuit is operable to apply a data detection algorithm to a data set to yield a detected output. The data decoder circuit is operable to repeatedly apply a data decoding algorithm to the detected output to yield a decoded output over a number of passes, where the number of passes is within an allowable number of local iterations selected based at least in part on a read gate signal.

23 Claims, 5 Drawing Sheets

SYSTEMS AND METHODS FOR GATE AWARE ITERATIVE DATA PROCESSING

BACKGROUND OF THE INVENTION

The present invention is related to systems and methods for performing data processing, and more specifically to systems and methods for scheduling processes in a data processing circuit.

Data processing circuits often include a data detector circuit and a data decoder circuit. In some cases many passes are made through both the data detector circuit and the data decoder circuit in an attempt to recover originally written data. Each pass through both data detector circuit and the data decoder circuit may include a number of iterations through the data decoder circuit. In some cases, a default processing through the data decoder and data detector circuits may not yield a correct result.

Hence, for at least the aforementioned reasons, there exists a need in the art for advanced systems and methods for data processing.

BRIEF SUMMARY OF THE INVENTION

The present invention is related to systems and methods for performing data processing, and more specifically to systems and methods for scheduling processes in a data processing circuit.

Various embodiments of the present invention provide methods that include applying a data detection algorithm by a data detector circuit to a data input to yield a detected output, and repeatedly applying a data decoding algorithm to the detected output over a number of passes. The number of passes is within an allowable number of local iterations that is selected based at least in part on a read gate signal.

This summary provides only a general outline of some embodiments of the invention. The phrases "in one embodiment," "according to one embodiment," "various embodiments", "in one or more embodiments", "particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS OF THE INVENTION

The present invention is related to systems and methods for performing data processing, and more specifically to systems and methods for scheduling processes in a data processing circuit.

Various embodiments of the present invention provide iterative data processing systems that include a data detector circuit and a data decoder circuit. Processing a data set through both the data detector circuit and the data decoder circuit is referred to as a "global iteration". During each global iteration, a data set may be processed through the data decoder circuit one or more times. Each pass through the data decoder circuit is referred to as a "local iteration". The number of global and local iterations that are applied to a given data set varies depending in part upon the quality of the received data sets. Where the quality of the data sets is high, the number of global and local iterations required to obtain the originally written data represented by the received data set is relatively small. In contrast, where the quality of the data sets is low, the number of global and local iterations required to obtain the originally written data represented by the received data set is relatively large. In some cases, both high quality data sets and low quality data sets are received. In such a situation, global iterations that would have otherwise been used for a high quality data set that converged (i.e., processing yielded the original data) earlier than an expected average may be assigned to another data set that may require more global iterations to converge. A default maximum number of local iterations may be applied to the processing data set during any given global iteration.

During data processing a read gate is asserted indicating that new data sets are being received and introduced to the iterative data processing system. When this read gate is constantly asserted, the standard distribution of local and global iterations discussed above may be used. Where, on the other hand, the read gate is de-asserted for a period, a modified distribution of local an global iterations is used. In one particular embodiment of the present invention, the data detection algorithm applied by the data detector circuit takes approximately 1/N of the time involved in receiving a new data set, and the default maximum number of local iterations of the data decoder algorithm applied by the data decoder circuit takes approximately 1/N of the time involved in receiving a new data set. N is an integer. In such a case, where the read gate de-asserts for a period corresponding to N applications of the data detection algorithm, the next slot of time used by the data detector circuit is left idle, the next slot of time plus T is left idle, the next slot of time plus 2T is left idle, and the idle time continues up to idling the next slot of time plus (N−1)T. In one particular case, N is four.

In addition, the number of local iterations allowed through the data decoder circuit is increased to use the processing bandwidth that would have been used by the output of the data detector circuit had it not been idle. In one particular embodiment of the present invention, the number of local iterations allowed by the data decoder circuit after an idle slot of time used by the data detector circuit is doubled. This allowance of extra applications of the data decode algorithms provides a performance increase in some scenarios when compared to increasing the number of allowable global iterations to use the same bandwidth freed when new data sets are not being consecutively received.

Various embodiments of the present invention provide methods that include applying a data detection algorithm by a data detector circuit to a data input to yield a detected output, and repeatedly applying a data decoding algorithm to the detected output over a number of passes. The number of passes is within an allowable number of local iterations that is selected based at least in part on a read gate signal. In some instances of the aforementioned embodiments, the allowable number of local iterations is selected to be a first number based upon assertion of the read gate signal indicating reception of the input data, and the allowable number of local iterations is selected to be a second number based upon assertion of the read gate signal indicating no reception of the input data. The second number is different than the first number. In some cases, the second number is larger than the first number. In one particular case, the second number is double the first number. In some instances of the aforementioned embodiments, the methods further include idling the data detector circuit when the read gate signal indicates no reception of the input data.

Other embodiments of the present invention provide data processing systems that include, a read gate signal, a data detector circuit, and a data decoder circuit. The read gat signal is operable to indicate reception of input data. The data detector circuit is operable to apply a data detection algorithm to a data input to yield a detected output. The data set is derived from a portion of the input data. The data decoder circuit is operable to repeatedly apply a data decoding algorithm to the detected output to yield a decoded output over a number of passes. The number of passes is within an allowable number of local iterations selected based at least in part on the read gate signal. In some instances of the aforementioned embodiments, the allowable number of local iterations is selected to be a first number based upon assertion of the read gate signal indicating reception of the input data, wherein the allowable number of local iterations is selected to be a second number based upon assertion of the read gate signal indicating no reception of the input data, and wherein the second number is double the first number.

In one or more instances of the aforementioned embodiments, the system further includes a gate based scheduler circuit that is operable to provide an extension indicator to the data decoder circuit, wherein the extension indicator allows a larger number of local iterations to be applied to the detected output based at least in part on the read gate signal. In some such instances, the larger number of local iterations to be applied to the detected output is selected when the read gate signal indicates no reception of the input data. In particular cases, the gate based scheduler circuit is further operable to provide an idle indicator to the data detector circuit causing the data detector circuit to idle for a processing period based at least in part on the read gate signal. In some such cases, the idle is selected when the read gate signal indicates no reception of the input data. In one particular instance of the aforementioned embodiments, the allowable number of local iterations is selected to be ten when the read gate signal indicates reception of the input data, and the allowable number of local iterations is selected to be twenty when the read gate signal indicates no reception of the input data.

Figure 1:
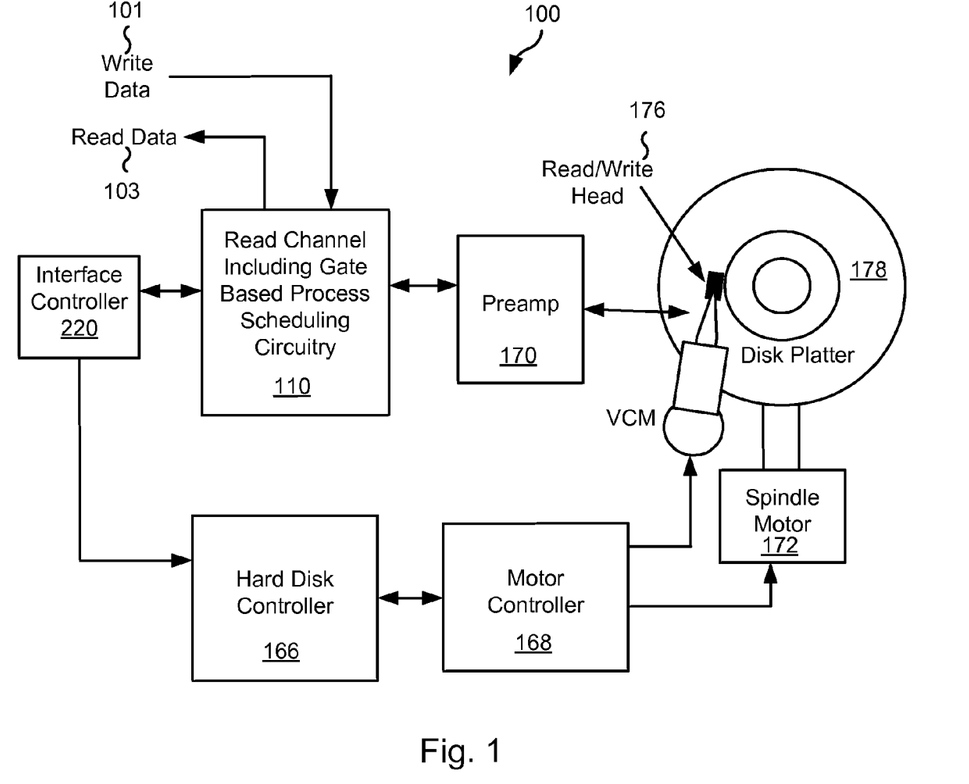
FIG. 1 shows a storage device including gate based process scheduling circuitry in accordance with some embodiments of the present invention.

Turning to FIG. 1, a storage system 100 including a read channel circuit 110 having gate based process scheduling circuitry is shown in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During operation, data is sensed from disk platter 178 and processed. This processing includes applying a data detection algorithm and a data decoding algorithm to the data set over a number of global iterations. Where data is being continuously received from disk platter 178, a number of global iterations and local iterations per global iteration may be applied to any given data set. Global iterations that would be expected to have been used in processing one data set can be used in relation to another data set. Thus, the maximum number of global iterations is variable. Where data is not received continuously a read gate signal will be de-asserted during periods where data is not being received. This condition signals the availability of additional bandwidth that is used to increase the maximum number of local iterations allowable during a given global iteration. In some embodiments of the present invention, data processing circuits similar to that discussed below in relation to FIG. 3 may be used, and/or the processing may be done similar to that discussed below in relation to FIGS. 4a-4b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 410 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

The data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Figure 2:
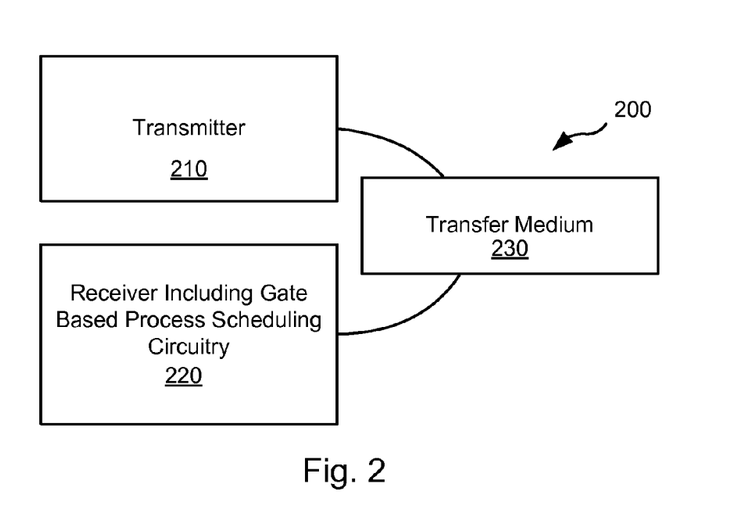
FIG. 2 shows a data transmission device including gate based process scheduling circuitry in accordance with some embodiments of the present invention.

Turning to FIG. 2, a data transmission device 200 including a receiver 220 having gate based process scheduling circuitry is shown in accordance with some embodiments of the present invention. Data transmission device 200 includes a transmitter 210 that is operable to transmit encoded information via a transfer medium 230 as is known in the art. The encoded data is received from transfer medium 230 by receiver 220. Transfer medium 230 may be any medium known in the art that is capable of transferring information including, but not limited to, a wireless transfer medium, a wired transfer medium, or an optical transfer medium. Based upon the disclosure provided herein, one of ordinary skill in the art will recognize a variety of transfer mediums that may be used in relation to different embodiments of the present invention.

During operation, data is received from transfer medium 230 and processed. This processing includes applying a data detection algorithm and a data decoding algorithm to the data set over a number of global iterations. Where data is being continuously received from transfer medium 230, a number of global iterations and local iterations per global iteration may be applied to any given data set. Global iterations that would be expected to have been used in processing one data set can be used in relation to another data set. Thus, the maximum number of global iterations is variable. Where data is not received continuously a read gate signal will be de-asserted during periods where data is not being received. This condition signals the availability of additional bandwidth that is used to increase the maximum number of local iterations allowable during a given global iteration. In some embodiments of the present invention, data processing circuits similar to that discussed below in relation to FIG. 3 may be used, and/or the processing may be done similar to that discussed below in relation to FIGS. 4a-4b.

Figure 3:
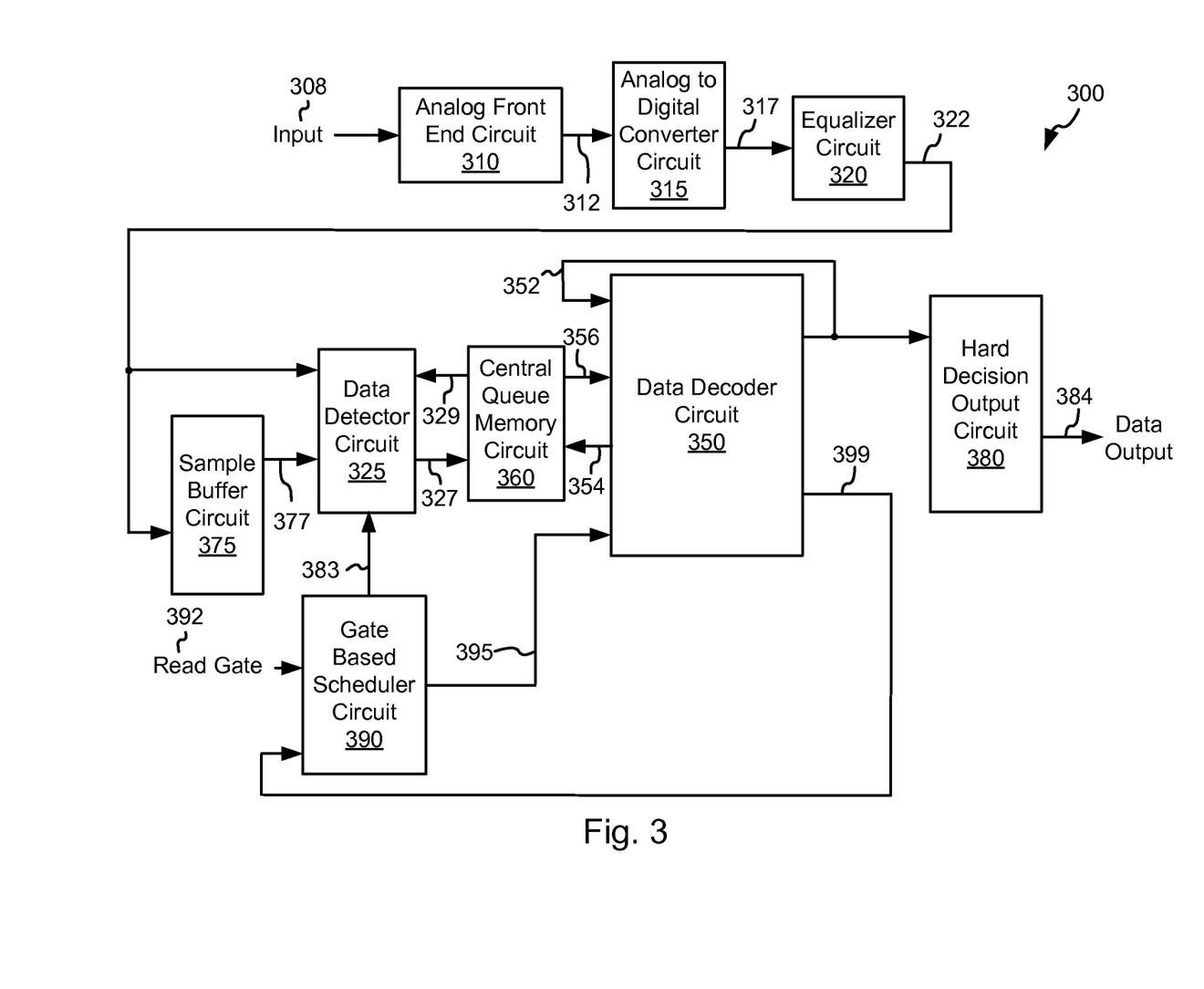
FIG. 3 depicts a data processing circuit having gate based process scheduling circuitry in accordance with some embodiments of the present invention.

Turning to FIG. 3, a data processing circuit 300 having iteration based decoder algorithm selection circuitry is shown in accordance with some embodiments of the present invention. Data processing circuit 300 includes an analog front end circuit 310 that receives an analog input 308. Analog front end circuit 310 processes analog input 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input 308 is derived from a read/write head assembly (not shown) that is disposed in relation to a storage medium (not shown). In other cases, analog input 308 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322. In some embodiments of the present invention, equalizer circuit 320 is a digital finite impulse response filter circuit as are known in the art.

Equalized output 322 is provided to both a data detector circuit 325 and to a sample buffer circuit 375. Sample buffer circuit 375 stores equalized output 322 as buffered data 377 for use in subsequent iterations through data detector circuit 325. Data detector circuit 325 may be any data detector circuit known in the art that is capable of producing a detected output 327. As some examples, data detector circuit 325 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 327 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. In some cases, central queue memory circuit 360 includes interleaving (i.e., data shuffling) and de-interleaving (i.e., data un-shuffling) circuitry known in the art. When data decoder circuit 350 is available, data decoder circuit 350 accesses detected output 327 from central queue memory circuit 360 as a decoder input 356. Data decoder circuit 350 applies a data decoding algorithm to decoder input 356 in an attempt to recover originally written data. Data decoder circuit 350 is operable to initially apply a data decoding algorithm to decoder input 356. In one particular embodiment of the present invention, the data decoding algorithm is a low density parity check decoding algorithm as are known in the art. The low density parity check decoding algorithm may be either a non-binary decoding algorithm or a binary decoding algorithm. Other types of data decoding algorithms may be used in relation to different embodiments of the present invention.

After applying the data decoding algorithm, a decoded output 352 is provided from data decoder circuit 350. Similar to detected output 327, decoded output 352 may include both hard decisions and soft decisions. Where the original data is recovered (i.e., the data decoding algorithm converges), decoded output 352 is stored to a memory included in a hard decision output circuit 380. In turn, hard decision output circuit 380 provides the converged decoded output 352 as a data output 384 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data was not recovered (i.e., the data decoding algorithm failed to converge) another local iteration through data decoder circuit 350 may be applied that is guided by decoded output 352. As is more fully described below, the maximum number of allowable local iterations depends in part on a local iteration input 395 provided by a gate based scheduler circuit 390. In one particular embodiment of the present invention, the maximum number of local iterations that may be applied during a global iteration when a read gate 392 is asserted back to back (i.e., a constant stream of received data) is ten. This number of local iterations is doubled for some processing slots occurring after read gate 392 is de-asserted. An indication of whether a data set has converged is provided as an output 399 from data decoder circuit 350 to gate based scheduler circuit 390.

Where none of the local iterations converge, another global iteration may be applied that is guided by a decoder output 354 that corresponds to decoded output 352. Data detector circuit 325 applies the data detection algorithm to buffered data 377 (i.e., the same data set) as guided by decoder output 354. Decoder output 354 is provided from central queue memory circuit 360 as a detector input 329. This iterative process passing through data detector circuit 325 and data decoder circuit 350 continues until either the data set converges or a timeout condition occurs. The timeout condition may be, for example, application of a maximum number of global iterations to the data set and/or lack of available space in sample buffer circuit 375 to maintain the currently processing data set and still be able to receive a new data set.

When read gate 392 is continuously asserted it indicates that data is being received as input 308 in a substantially continuous fashion. In contrast, where read gate 392 de-asserts it indicates that data is not currently being received as input 308 and stored as equalized output 322 to sample buffer circuit 375 as fast as data processing circuit 300 can accept it. Because data is not being received as fast as data processing circuit 300 can accept it, excess bandwidth is available for processing data sets that are already stored in sample buffer circuit 375. Gate based scheduler circuit 390 is operable to assign this excess bandwidth to be used to allow additional local iterations to be applied by data decoder circuit 350 to select data sets available from central queue memory circuit 360 by asserting local iteration input 395, and to idle data detector circuit 325 during data processing slots that would have otherwise been devoted to a newly received data set by asserting a detector idle output 383. By applying additional local iterations during given global iterations data sets are given an enhanced ability to converge.

Figure 5A:
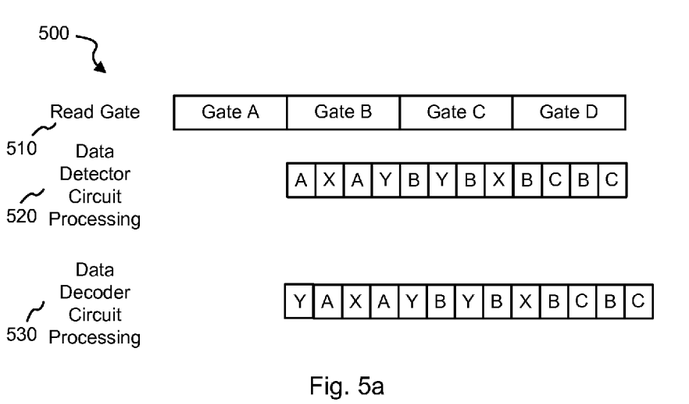
FIG. 5a is a timing diagram showing an example of gate based process scheduling where gates are received back to back.
Figure 5B:
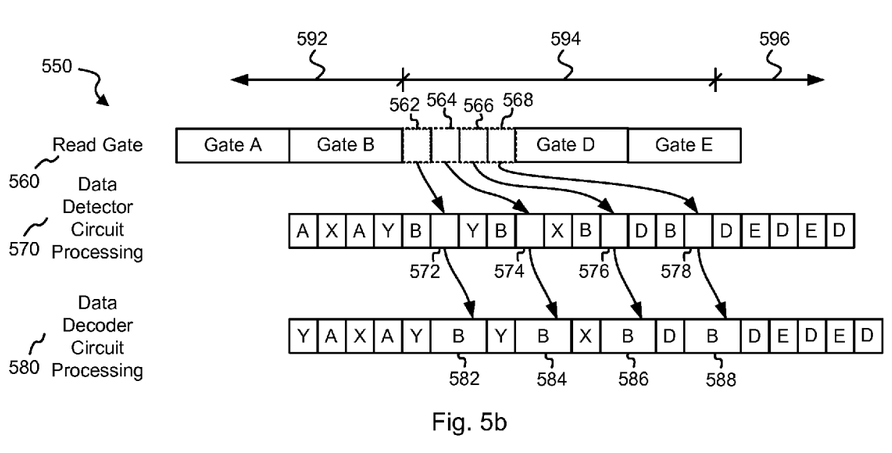
FIG. 5b is a timing diagram showing an example of gate based process scheduling where gates are not received back to back.

Examples of the operation of gate based scheduler circuit 390 are shown for standard processing where read gate 392 is asserted such that data processing circuit is receiving data as fast as it possibly can (FIG. 5a), and for modified processing where read gate 392 is asserted such that data processing circuit is receiving data at a lower bandwidth than can be supported by data processing circuit 300 (FIG. 5b). Turning to FIG. 5a, a timing diagram 500 shows an example of gate based process scheduling applied by gate based scheduler circuit 390 where read gate 392 (shown as read gate 510) is asserted back to back (i.e., data is continuously received via input 308). As shown, as data is being received into sample buffer circuit 375 (represented by the time line showing the reception of data set A, B, C, D), the data detection algorithm may be applied four times by data detector circuit 325. As a particular example, while data set B (represented as Gate B) is being received, the data detection algorithm is applied to data set A (that was received during gate A), then to data set X (that was received during a gate X (not shown, but preceding gate A)), then to data set A again, and then to data set Y (that was received during a gate Y (not shown, but preceding gate A)). It should be noted that in different embodiments of the present invention that more or fewer than four applications of the data detection algorithm may be applied during reception of an incoming data set.

Where data is continuously being received as in this case where read gate 510 is always asserted, all of the processing slots of data detector circuit 325 (shown as data detector circuit processing 520) are used, and the maximum number of local iterations allowed during the processing slots of data decoder circuit 350 (shown as data decoder circuit processing 530) are used. Of note, the number of global iterations applied to a given data set (i.e., data sets A, B, C, D, X, Y) may vary depending, for example, on the difference in quality of the received data sets.

Turning to FIG. 5b, a timing diagram 550 shows an example of gate based process scheduling where gates are not received back to back (i.e., data is not received as input 308 as fast as data processing circuit 300 can received it. In particular, timing diagram 550 shows a period 592 where read gate 392 is asserted back to back resulting in standard distribution of global and local iterations that was shown in FIG. 5a, and a period 596 where the standard distribution is restarted. During a period 594, the processing is modified to take advantage of excess bandwidth available because of a discontinuity of the received data as indicated by a de-assertion of read gate 392 (shown as read gate 560). As shown the de-assertion of read gate 392 extends over a period during which an entire data set could have been received. For illustration purposes, the de-assertion is broken into four discrete segments 562, 564, 566, 568 that each correspond to a period of a time slow of data detector circuit 325.

De-assertion of read gate 392 results in assertion of detector idle output 383 that causes data detector circuit 325 to be idle at time slots corresponding to segments 562, 564, 566, 568. In particular, as shown in a data detector circuit processing 570, segment 562 results in idling data detector circuit 325 for the next processing slot (shown as a slot 572), segment 564 results in idling data detector circuit 325 for the next processing slot plus three (shown as a slot 574), segment 566 results in idling data detector circuit 325 for the next processing slot plus six (shown as a slot 576), and segment 568 results in idling data detector circuit 325 for the next processing slot plus nine (shown as a slot 578).

In addition, excess local iterations are allowed for processing slots of data decoder circuit 350 that correspond to segments 562, 564, 566, 568. In particular, as shown in a data decoder circuit processing 580, segment 562 results in doubling the number of local iterations allowed by data decoder circuit 350 for the next processing slot (shown as a slot 582), segment 564 results in doubling the number of local iterations allowed by data decoder circuit 350 for the next processing slot (shown as a slot 584), segment 566 results in doubling the number of local iterations allowed by data decoder circuit 350 for the next processing slot (shown as a slot 586), and segment 568 results in doubling the number of local iterations allowed by data decoder circuit 350 for the next processing slot (shown as a slot 588). It should be noted that while the examples of FIG. 5a and FIG. 5b are based upon four processing slots during the reception of a new data set, that other numbers of processing slots may be available during the reception of a new data set.

Figure 4A:
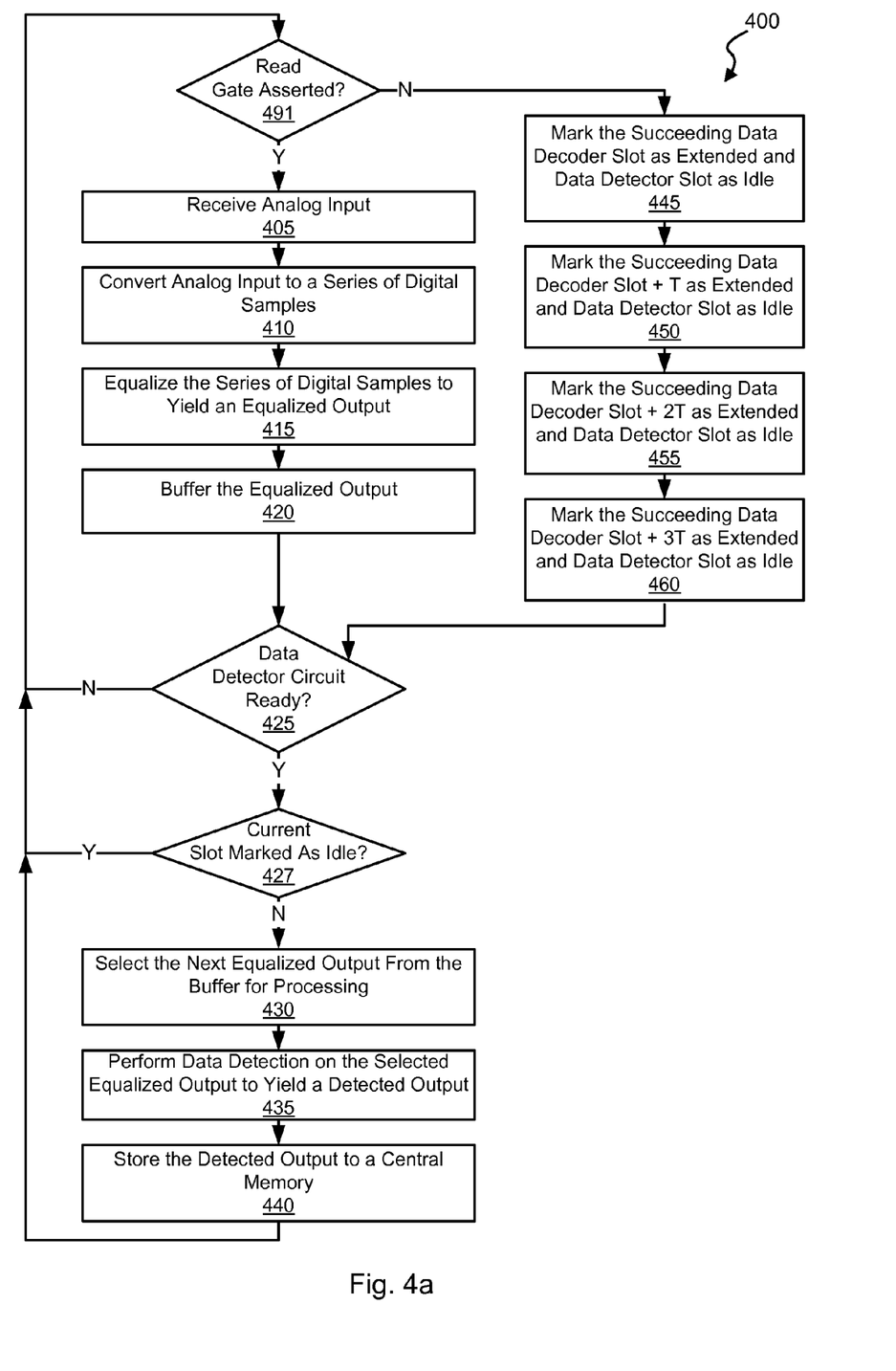
FIGS. 4a-4b are flow diagrams showing a method in accordance with some embodiments of the present invention for iterative data processing including gate based process scheduling.
Figure 4B:
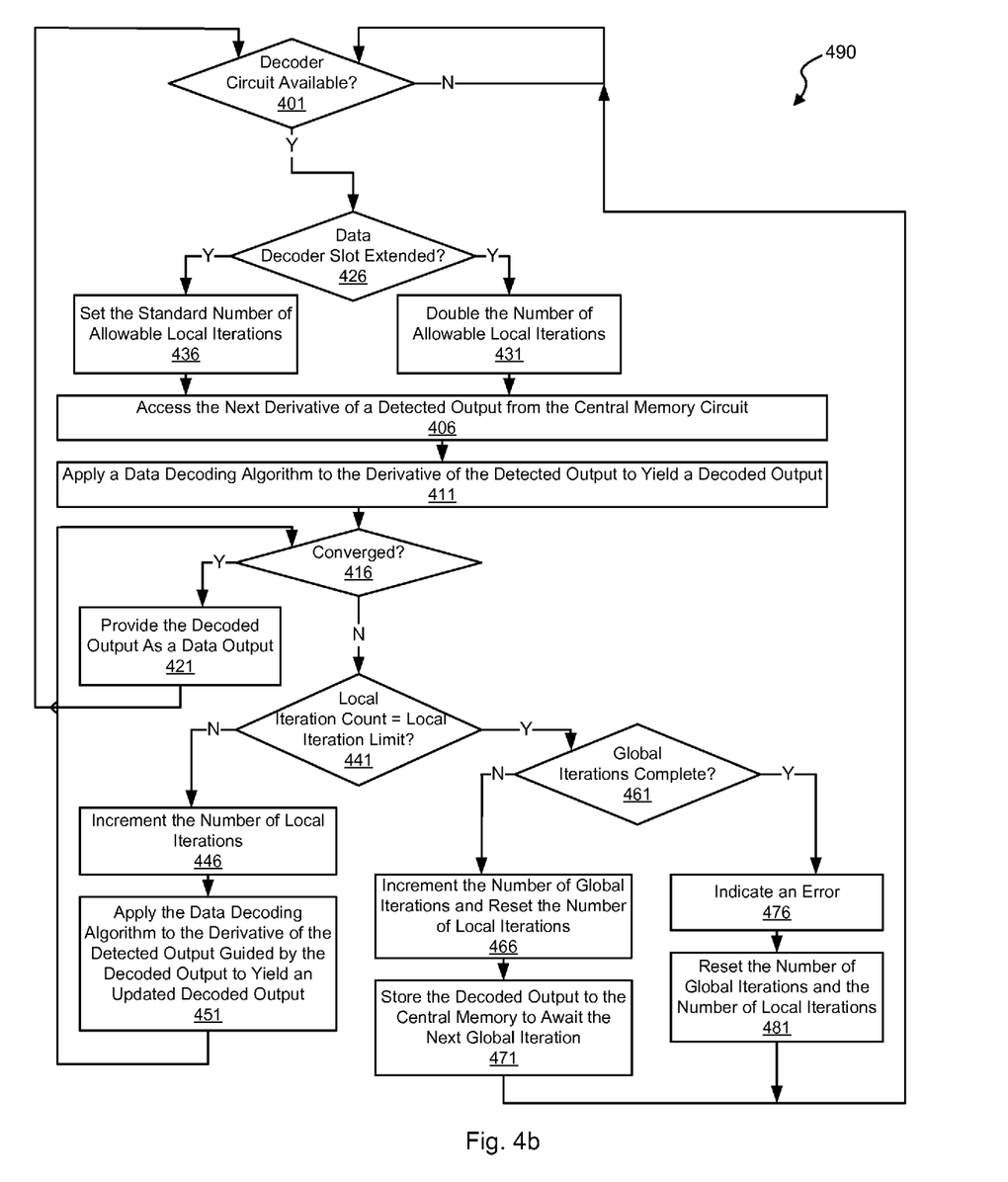

Turning to FIG. 4a-4b, flow diagrams 400, 490 show a method in accordance with some embodiments of the present invention for iterative data processing including gate based process scheduling. Turning to FIG. 4a and following flow diagram 400, it is determined whether a read gate is asserted (block 491). Assertion of the read gate indicates that data is currently being received by a data processing circuit, and de-assertion indicates that data is not currently being received. Where data is not currently being received, it signals that excess bandwidth is available that may be applied to another previously received data set.

Where the read gate is asserted (block 491), an analog input represented a new data set is received (block 405). This analog input may be derived from, for example, a storage medium or a data transmission channel. Based upon the disclosure provided herein, one of ordinary skill in the art will recognize a variety of sources of the analog input. The analog input is converted to a series of digital samples (block 410). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 415). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The equalized output is buffered (block 420). Alternatively, where the read gate is not asserted (block 491), the succeeding data decoder processing slot is marked as extended and the succeeding data detector slot is marked as idle (block 445), the succeeding data decoder processing slot plus T is marked as extended and the succeeding data detector slot plus T is marked as idle (block 450), the succeeding data decoder processing slot plus 2T is marked as extended and the succeeding data detector slot plus 2T is marked as idle (block 455), and the succeeding data decoder processing slot plus 3T is marked as extended and the succeeding data detector slot plus 3T is marked as idle (block 460).

It is determined whether a data detector circuit is available to apply a data detection algorithm (block 430). The data detection algorithm may be, for example, a maximum a posteriori data detection algorithm as are known in the art. Based upon the disclosure provided herein, one of ordinary skill in the art will recognize a variety of data detection algorithms that may be used in relation to different embodiments of the present invention. Where the data detector circuit is available (block 425), it is determined whether the current data detector slot is marked as idle (block 427). Where either the data detector circuit is not available or the current data detector slot is marked as idle (blocks 425, 427), processing through the data detector circuit is delayed. Otherwise, where the data detector circuit is available and the current data detector slot is not marked as idle (blocks 425, 427), the next equalized output from the buffer is selected for processing (block 430). This selection may be done in accordance with any data processing circuit selection algorithm known in the art. A data detection algorithm is applied to the selected equalized output to yield a detected output (block 435), and the detected output (or a derivative thereof) is stored to a central memory circuit (block 440). In some cases, the stored data is interleaved or shuffled. This stored data may then be accessed from the central memory for data decoding (flow diagram 490). Flow diagram 490 is discussed in relation to FIG. 4b. An example timing diagram corresponding to the aforementioned approach is discussed below in relation to FIGS. 5a-5b.

Turning to FIG. 4b, flow diagram 490 shows an implementation of the aforementioned data decode processing. Following flow diagram 490, it is determined whether a decoder circuit is available to process a previously stored detected output (block 401). Where the decoder circuit is available (block 401), it is determined whether the currently processing data decoder slot is marked as extended (block 426). This extension is indicated in blocks 445-460 of FIG. 4a. Where the currently processing data decoder slot is not marked as extended (block 426), the number of allowable local iterations to be applied by the data decoder circuit is set equal to a default or standard number of local iterations (block 436). Alternatively, where the currently processing data decoder slot is marked as extended (block 426), the number of allowable local iterations to be applied by the data decoder circuit is set as double the default or standard number of local iterations (block 431).

The next derivative of a detected output is selected for processing and accessed from the central memory circuit (block 406). A data decoding algorithm is then applied to the derivative of the detected output to yield a decoded output (block 411). The data decoding algorithm may be, for example, a low density parity check decoding as are known in the art. Based upon the disclosure provided herein, one of ordinary skill in the art will recognize a variety of data decoding algorithms that may be used in relation to different embodiments of the present invention.

It is determined whether the data decoding process resulted in a converged output (i.e. the originally written data set) (block 416). Where the output converged (block 416), the decoded output is provided as a data output (block 421). In contrast, where the output failed to converge (block 416), it is determined if the number of local iterations of the data decoding algorithm already applied to the currently processing data set is equal to the allowable limit of local iterations (block 441). Where fewer number of local iterations than that allowed have been applied (block 441), the number of local iterations is incremented (block 446) and the data decoding algorithm is re-applied to the data set guided by the decoded output to yield an updated decoded output (block 451). The processes from block 416 are then repeated for the next local iteration.

Alternatively, where the number of allowable local iterations has been exceeded (block 441), it is determined whether a maximum number of global iterations have been applied or another timeout condition has occurred (block 461). Where the timeout condition or the maximum number of global iterations has not been exceeded (block 461), the number of global iterations is incremented and the number of local iterations is reset (block 466). The decoded output is stored to the central memory to await the next global iteration (block 471). Alternatively, where the timeout condition or the maximum number of global iterations has been exceeded (block 461), an error is indicated (block 476 and the number of global iterations and the number of local iterations are reset (block 481). An example timing diagram corresponding to the aforementioned approach is discussed below in relation to FIGS. 5*a*-5*b*.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a read gate signal operable to indicate reception of input data;
   a data detector circuit operable to apply a data detection algorithm to a data set to yield a detected output, wherein the data set is derived from a portion of the input data; and
   a data decoder circuit operable to repeatedly apply a data decoding algorithm to the detected output to yield a decoded output over a number of passes, wherein the number of passes is within an allowable number of local iterations selected based at least in part on the read gate signal.

2. The data processing system of claim 1, wherein the allowable number of local iterations is selected to be a first number based upon assertion of the read gate signal indicating reception of the input data, wherein the allowable number of local iterations is selected to be a second number based upon assertion of the read gate signal indicating no reception of the input data, and wherein the second number is double the first number.

3. The data processing system of claim 1, wherein the system further comprises:
   a gate based scheduler circuit operable to provide an extension indicator to the data decoder circuit, wherein the extension indicator allows a larger number of local iterations to be applied to the detected output based at least in part on the read gate signal.

4. The data processing system of claim 3, wherein the larger number of local iterations to be applied to the detected output is selected when the read gate signal indicates no reception of the input data.

5. The data processing system of claim 3, wherein the gate based scheduler circuit is further operable to provide an idle indicator to the data detector circuit causing the data detector circuit to idle for a processing period based at least in part on the read gate signal.

6. The data processing system of claim 5, wherein the idle is selected when the read gate signal indicates no reception of the input data.

7. The data processing system of claim 1, wherein the allowable number of local iterations is selected to be ten when the read gate signal indicates reception of the input data, and wherein the allowable number of local iterations is selected to be twenty when the read gate signal indicates no reception of the input data.

8. The data processing system of claim 1, wherein the data decoding algorithm is a low density parity check decoding algorithm.

9. The data processing system of claim 8, wherein the data decoding algorithm is selected from a group consisting of: a binary low density parity check decoding algorithm, and a non-binary low density parity check decoding algorithm.

10. The data processing system of claim 1, wherein the data detector circuit is selected from a group consisting of: a Viterbi algorithm data detector circuit, and a maximum a posteriori data detector circuit.

11. The data processing system of claim 1, wherein the data processing system is implemented as part of a device selected from a group consisting of: a storage device and a receiving device.

12. The data processing system of claim 1, wherein the data processing system is implemented as part of an integrated circuit.

13. The data processing system of claim 1, wherein the data processing system is implemented as part of a redundant array of inexpensive disks.

14. The data processing system of claim 1, wherein the read gate signal is distinct from the data set.

15. A method, the method comprising:
  applying a data detection algorithm by a data detector circuit to a data input to yield a detected output; and
  repeatedly applying a data decoding algorithm to the detected output over a number of passes, wherein the number of passes is within an allowable number of local iterations selected based at least in part on a read gate signal.

16. The method of claim 15, wherein the allowable number of local iterations is selected to be a first number based upon assertion of the read gate signal indicating reception of the input data, wherein the allowable number of local iterations is selected to be a second number based upon assertion of the read gate signal indicating no reception of the input data, and wherein the second number is different than the first number.

17. The method of claim 16, wherein the second number is larger than the first number.

18. The method of claim 17, wherein the second number is double the first number.

19. The method of claim 15, wherein the method further comprises:
  idling the data detector circuit when the read gate signal indicates no reception of the input data.

20. The method of claim 15, wherein the read gate signal is distinct from the data input.

21. A storage device, the storage device comprising:
  a storage medium;
  a head assembly disposed in relation to the storage medium and operable to provide a sensed signal corresponding to information on the storage medium;
  a read channel circuit including:
    an analog front end circuit operable to provide an analog signal corresponding to the sensed signal;
    a read gate signal indicating reception of input data as the analog signal;
    an analog to digital converter circuit operable to sample the analog signal to yield a series of digital samples;
    an equalizer circuit operable to equalize the digital samples to yield a sample set;
    a data detector circuit operable to apply a data detection algorithm to the sample set to yield a detected output; and
    a data decoder circuit operable to repeatedly apply a data decoding algorithm to the detected output to yield a decoded output over a number of passes, wherein the number of passes is within an allowable number of local iterations selected based at least in part on the read gate signal.

22. The storage device of claim 21, the storage device further comprising:
  a gate based scheduler circuit operable to:
    provide an extension indicator to the data decoder circuit, wherein the extension indicator allows a larger number of local iterations to be applied to the detected output based at least in part on the read gate signal indicating no reception of the input data; and
    provide an idle indicator to the data detector circuit operable to cause the data detector circuit to idle for a processing period based at least in part on the read gate signal indicating no reception of the input data.

23. The storage device of claim 21, wherein the read gate signal is distinct from the sample set.

* * * * *